July 10, 1956 M. F. DE GRAVE 2,753,722
SPEED CHANGING DEVICE

Filed June 13, 1952 3 Sheets-Sheet 1

INVENTOR
MARVIN F. De GRAVE,
BY
ATTORNEY

July 10, 1956

M. F. DE GRAVE 2,753,722

SPEED CHANGING DEVICE

Filed June 13, 1952

INVENTOR

MARVIN F. De GRAVE,

BY *[signature]*

ATTORNEY

United States Patent Office 2,753,722
Patented July 10, 1956

2,753,722

SPEED CHANGING DEVICE

Marvin Franklin De Grave, Marysville, Ohio, assignor, by mesne assignments, to The Murray Corporation of America, Detroit, Mich., a corporation of Delaware Application June 13, 1952, Serial No. 293,241

2 Claims. (Cl. 74—217)

This invention relates to speed changing devices and more specifically to a speed reduction gearing of the belt and pulley type providing a very simple but positive drive.

The object of the present invention is to provide such a speed changing device capable of various speed changes yet involving the minimum number of separate and dissimilar units, in combination with a single drive shaft and a single driven shaft both rotating in the same direction.

Another object is to further simplify the construction by eliminating all mechanical gear shifting means and collateral devices usually necessary in speed changing gearing generally.

A further object is the provision of a belt and pulley speed changing gearing wherein the pulleys on the driving shaft and on the driven shaft are substantially identical as to size and design but positioned and mounted in reverse order on the respective shafts, thus making it unnecessary to manufacture and maintain on hand for replacement various assortments of sizes and shapes of pulleys.

A still further object is to simplify the interconnecting belt combinations, whereby each belt is the same size and shape irrespective of the speed change selected or desired.

Generally stated, the improved speed changing device comprises parallel driving and driven shafts, each having mounted thereon a somewhat similar combination of oppositely disposed pulleys of various sizes, said pulleys on the respective shafts being alternately keyed and freely mounted, the directly opposite individual pulleys of the respective groups being reversed as to size and as to the manner of mounting on their respective shafts. These oppositely disposed pulley groups or combinations are designed to give many different speed changes through a belt drive, whereby all of said belts are of the same size and freely interchangeable regardless of the speed increase or reduction desired.

The invention herein has been illustrated and will be described as a speed reduction device but it is obvious that by a simple reversal of parts the same will function also as a speed increasing device.

The preferred embodiment of the invention is illustrated in the accompanying drawings in which—

Figure 1:
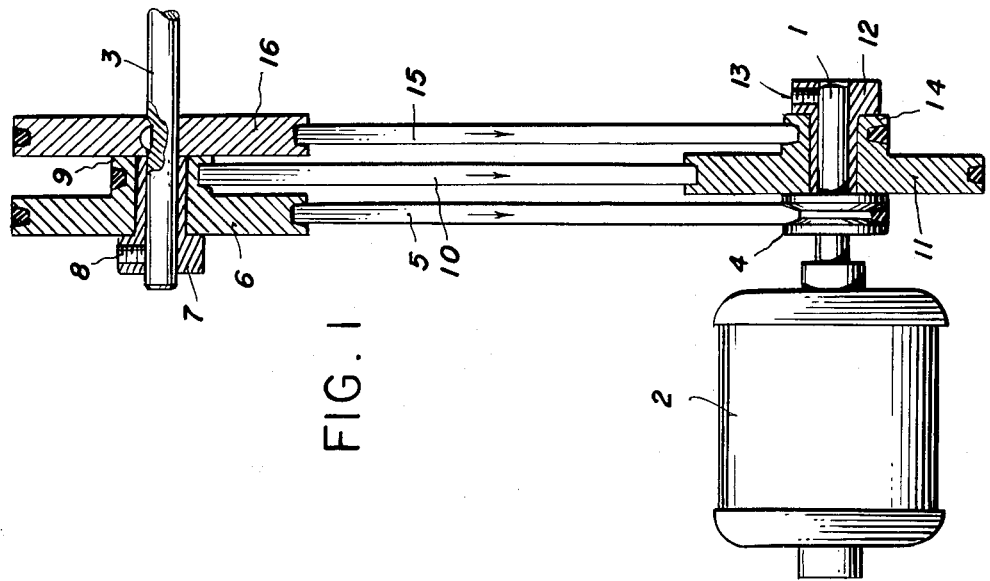
Figure 1 is a view partly in section and partly in elevation of the most simple form of the invention showing the arrangement of the oppositely disposed combination speed reducing pulleys mounted on the driving and driven shafts with their interconnecting driving belts to produce a relatively non-changing definite speed reduction.
Figure 2:
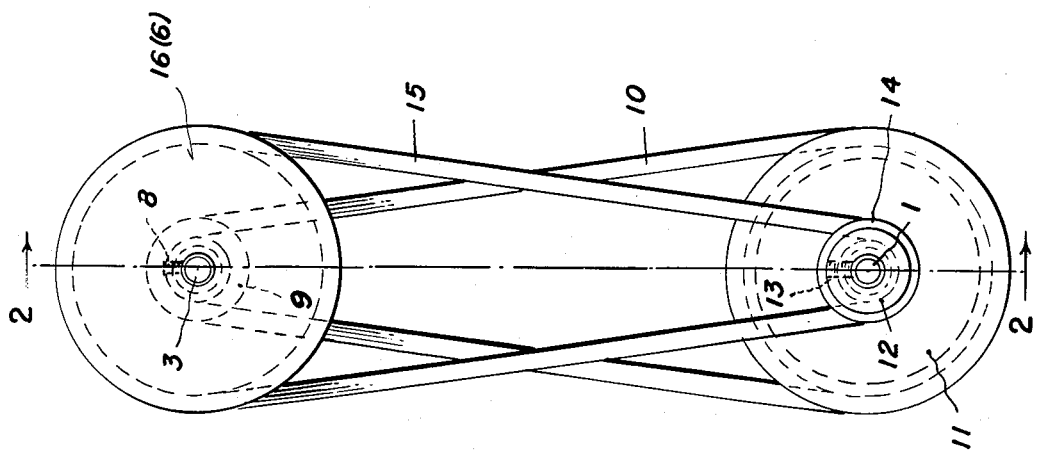
Figure 2 is an end elevational view of Figure 1.

Referring to the drawings in detail and with particular reference to Figures 1 and 2, the improved speed reducing gearing comprises a shaft 1 driven by any source of power, such as an electric motor 2, arranged in parallel relation to a driven shaft 3, which shaft may be connected to any device or mechanism to be driven at a speed less than the speed of the driving shaft or motor shaft.

To obtain this speed reduction of the driven shaft with respect to the driving shaft in a definite and positive manner, these parallel shafts 1 and 3 are connected by a belt and single step pulley drive combination, comprising a small pulley 4 keyed to the driving shaft 1 connected by a belt 5 to an oppositely disposed and aligned pulley 6 freely rotatable on a bushing 7 secured by a set screw 8 or the like, to the driven shaft 3.

This pulley 6 has integrally formed therewith a small pulley 9 connected by a belt 10 to a large pulley 11 freely rotatably mounted on a bushing 12 secured by a set screw or the like 13 to the driving shaft 1. Like pulley 6, said pulley 11 carries a small pulley 14 integrally formed therewith and said pulley 14 is connected by a belt 15 to a large pulley 16 keyed to the driven shaft 3.

It will be noted that the large pulleys 6, 11 and 16, are the same diameter and that the small single step pulley 4 and pulleys 9 and 14 are the same diameter and that each of the small pulleys is aligned with its respective large pulley, so that the respective belts connecting these pulleys are of the same length and interchangeable.

From the above description it will be apparent that pulley 6 with its integral pulley 9 is identical with pulley 11 and its integral pulley 14 and also bushings 7 and 12 are identical, so that the number of different kinds of parts are reduced to a minimum, thus saving on stock necessary to carry for replacements.

With the construction as above described and with the diameter of pulleys as shown in Figures 1 and 2, a speed of rotation of the driven shaft 3 will be reduced to one-eighth of the speed of the motor speed of driven shaft 1 connected thereto.

Figure 3:
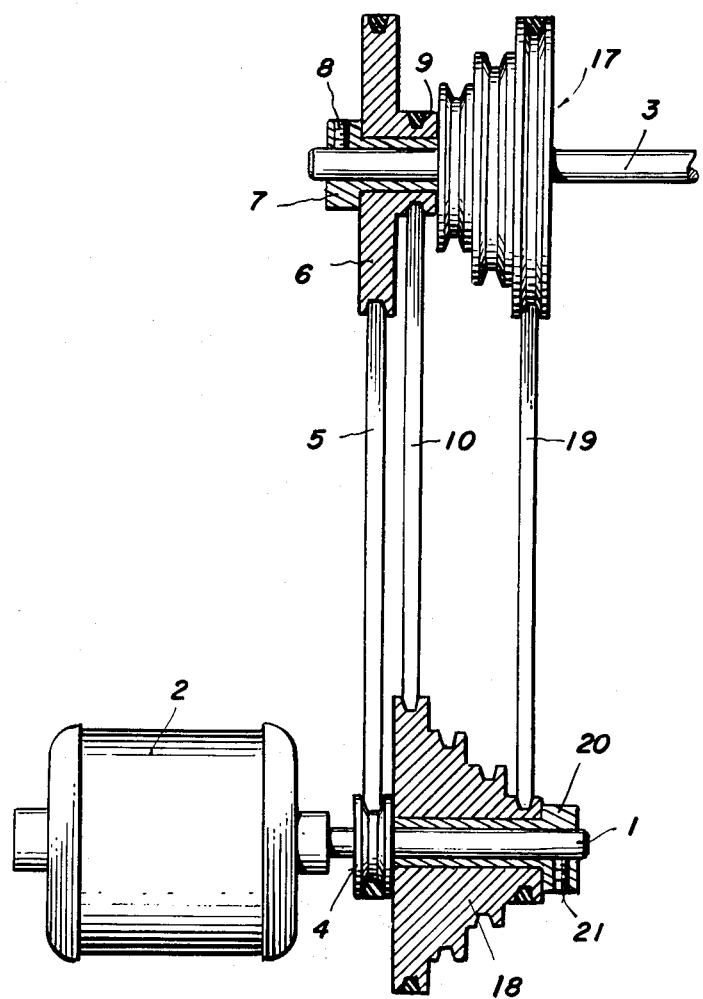
Figure 3 is a modification of Figure 1 whereby stepped pulleys are substituted for certain of the pulleys illustrated in Figure 1, in order to provide for a change speed reduction by simply shifting the connecting belts in an obvious manner.
Figure 4:
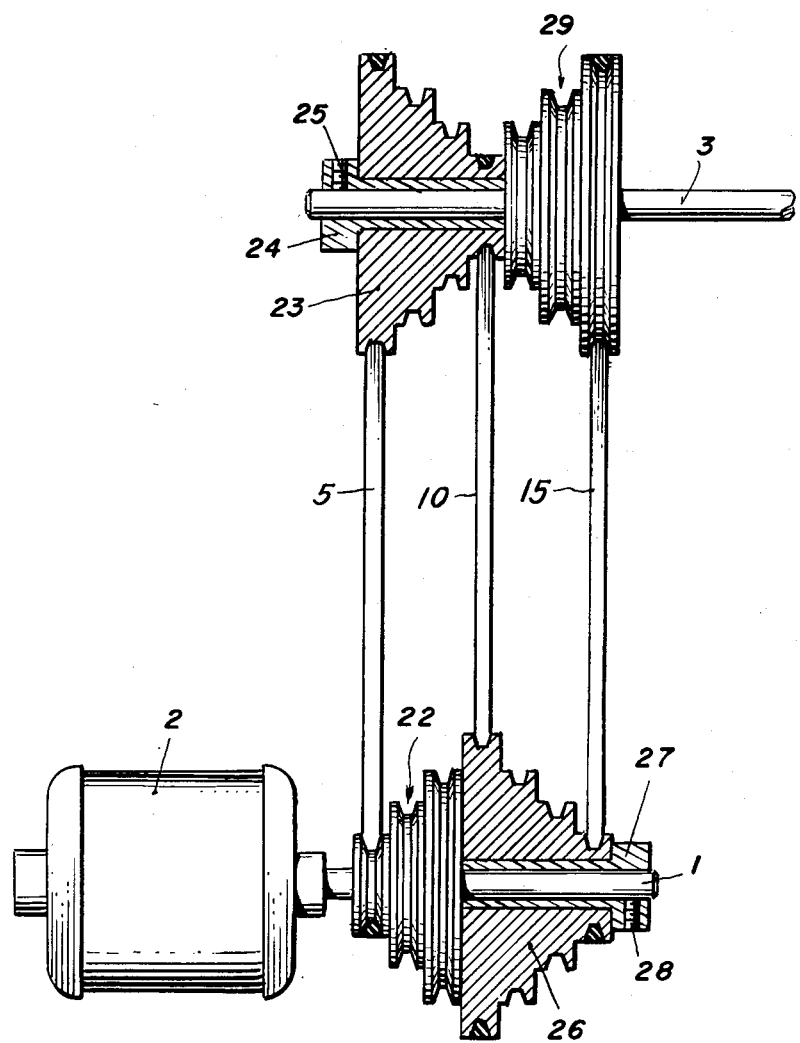
Figure 4 illustrates a further modification whereby a combination of oppositely disposed stepped pulleys are employed on both shafts to obtain any number of speed reducing combinations.

With the drive as shown in Figures 1 and 2, a predetermined set reduced speed may be obtained, but by slight modification this speed reduction may be varied as desired to provide for most any ratio of speed reduction, as illustrated in Figures 3 and 4.

Referring to Figure 3, it will be noted that the single step pulley 4 and pulleys 6 and 9 are the same as in Figure 1, but by substituting a compound stepped pulley 17 for the single large pulley 16 of Figure 1, and substituting a compound stepped pulley 18 for the integral pulleys 11 and 14, a variable speed reduction may be obtained by simply shifting the belt 19 and here again it will be noted that all of the belts are of the same size or length. It is to be further understood that compound pulley 18 is freely rotatably mounted on a bushing 20 secured to the driving shaft 1 by a set screw 21. The stepped pulley 17 is keyed to the driven shaft 3, similar to that shown in Figure 1.

As a further modification of this variable speed reduction device, reference is made to Figure 4, wherein a compound stepped pulley 22 is substituted for the small single step pulley 4 as shown in Figure 1 and like pulley 4, this pulley 22 is keyed to the driving shaft 1.

Also in Figure 4 a compound stepped pulley 23 is substituted for the integrally formed large and small pulleys 6 and 9 shown in Figure 1. This pulley 23 is freely rotatable on a bushing 24 secured to the driven shaft 3 by a set screw or the like 25. Further, in the modification as shown in Figure 4, a stepped pulley 26 is freely mounted on a bushing 27 secured to the driving shaft 1 by a set screw 28. Aligned with this stepped pulley 26 is a stepped pulley 29 keyed to the driven shaft 3, said pulley 29 replacing the single pulley 16 as shown in Figure 1.

In all the forms or modifications, it will be noted that the same principles are involved and that in every instance the driving and driven shafts will rotate in the same direction and also all of the belts will be of the same length. These belts are shown as V-belts and the various pulleys are provided with corresponding V grooves but it is to be understood that flat pulleys and flat belts could be used.

From the foregoing it is believed that the operation of the device and the results accomplished will be apparent.

In Figure 1, the single step pulley 4 being keyed to the driving shaft 1, motion is transmitted through belt 5 to the freely rotatable larger pulley 6 on the driven shaft 3 which, owing to its size, will rotate at a slower speed than pulley 4 and pulley 9, which is carried by the large pulley 6, will rotate at the same reduced speed as pulley 6. This slower speed is then transmitted by belt 10 to the large pulley 11 freely rotatable on the driving shaft 1, which will further pull down the speed. Smaller pulley 14 carried by large pulley 11 will rotate at the same reduced speed as pulley 11 and this further reduced speed will be transmitted to the large pulley 16 keyed to the driven shaft 3 and thus a still further speed reduction is obtained.

With the construction and arrangement and with the relative sizes of the pulleys as shown in Figure 1, there is an actual reduction of one-eighth of the motor speed.

The device as shown in Figures 3 and 4 operate in substantially the same manner except that by the substitution of stepped pulleys as shown and described, any number of speed reductions may be obtained by simply shifting certain of the belts in an obvious manner.

Also, by simply reversing the drive and driven shafts with the pulleys arranged thereon as shown, the mechanism can be used as a speed increasing device.

Having thus described the invention, what is claimed is:

1. In a speed reduction device, a power source, a driving shaft directly driven by said power source, a relatively small pulley secured to said shaft, a driven shaft, a multiple pulley of respective large and small diameters freely mounted on said driven shaft, a belt connecting said small pulley on the driving shaft and the larger diameter pulley of said multiple pulley on the driven shaft, a stepped pulley of several diameters rotatably mounted on said driving shaft, a belt connecting the smaller pulley of the first mentioned multiple pulley with the larger pulley of said stepped pulley on the driving shaft, a stepped pulley of several diameters secured to said driven shaft, and a belt connecting the small pulley of the stepped pulley on the driving shaft to the largest pulley of the stepped pulley on said driven shaft, all of said belts being of the same length.

2. In a speed reduction device, a power source, a driving shaft directly driven by said power source, and a driven shaft mounted parallel thereto, a stepped pulley of several diameters secured to said driving shaft, a stepped pulley of several diameters freely mounted on said driven shaft, a belt connecting the smallest pulley of the stepped pulley on said driving shaft with the largest diameter pulley of said stepped pulley on said driven shaft, a multiple pulley comprising several stepped pulleys of various diameters rotatably mounted on said driving shaft, a belt connecting the smallest pulley of the stepped pulley on said driven shaft with the largest pulley of the freely rotatable stepped pulley on said driving shaft, a multiple pulley comprising several stepped pulleys of various diameters secured to said driven shaft and interchangeable belts connecting said multiple pulleys.

References Cited in the file of this patent

UNITED STATES PATENTS

| | | |
|---|---|---|
| 1,909,522 | Collins | May 16, 1933 |
| 2,430,798 | Alexander | Nov. 11, 1947 |
| 2,473,963 | McKelvey | June 21, 1949 |

FOREIGN PATENTS

| | | |
|---|---|---|
| 998,591 | France | Sept. 26, 1951 |